United States Patent
Constantine et al.

(10) Patent No.: US 7,890,575 B1
(45) Date of Patent: Feb. 15, 2011

(54) DYNAMIC PERSISTENT USER MANAGEMENT IN DELEGATED ENVIRONMENTS

(75) Inventors: James Constantine, San Francisco, CA (US); Rinaldo S. DiGiorgio, Easton, CT (US); Raymond E. Maslinski, Fairport, NY (US)

(73) Assignee: Oracle America, Inc., Redwood City, CA (US)

( * ) Notice: Subject to any disclaimer, the term of this patent is extended or adjusted under 35 U.S.C. 154(b) by 785 days.

(21) Appl. No.: 11/462,266

(22) Filed: Aug. 3, 2006

(51) Int. Cl.
*G06F 15/16* (2006.01)

(52) U.S. Cl. .................... 709/203; 709/217; 709/220; 709/221; 717/168

(58) Field of Classification Search .............. 709/203
See application file for complete search history.

(56) References Cited

U.S. PATENT DOCUMENTS

| | | | |
|---|---|---|---|
| 6,233,582 B1 * | 5/2001 | Traversat et al. | 707/102 |
| 6,757,821 B1 * | 6/2004 | Akiyama et al. | 713/100 |
| 6,910,065 B2 * | 6/2005 | Matsuki | 709/203 |
| 7,254,624 B2 * | 8/2007 | Kinyon et al. | 709/220 |
| 2001/0042212 A1 * | 11/2001 | Du et al. | 713/200 |
| 2002/0091697 A1 * | 7/2002 | Huang et al. | 707/10 |
| 2002/0147938 A1 * | 10/2002 | Hamilton et al. | 714/6 |
| 2002/0178239 A1 * | 11/2002 | Kinyon et al. | 709/220 |
| 2004/0210796 A1 * | 10/2004 | Largman et al. | 714/20 |
| 2004/0236974 A1 * | 11/2004 | Brown et al. | 713/320 |
| 2005/0091346 A1 * | 4/2005 | Krishnaswami et al. | 709/220 |
| 2005/0235045 A1 * | 10/2005 | Narayanaswami et al. | 709/217 |

FOREIGN PATENT DOCUMENTS

EP 0658843 A1 * 1/1994

* cited by examiner

*Primary Examiner*—Tammy Thanh Nguyen
*Assistant Examiner*—Natisha Cox
(74) *Attorney, Agent, or Firm*—Marsh Fischmann & Breyfogle LLP; Kent A. Lembke; Jonathon A. Szumny

(57) ABSTRACT

A delegated environment manager for identifying and inventorying characteristics associated with user's delegated environments. The inventory of the characteristics associated with a particular delegated environment is stored for later retrieval. Upon receiving a request to recreate a previously stored delegated environment, the delegated environment manager retrieves the inventory of the characteristics associated with the requested delegated environment and compares that inventory of characteristics with an inventory of characteristics associated with a user's current delegated environment. Differences between the two inventories are identified and the delegated environment manager alters characteristics as necessary to recreate the previously stored delegated environment.

18 Claims, 3 Drawing Sheets

DYNAMIC PERSISTENT USER MANAGEMENT IN DELEGATED ENVIRONMENTS

BACKGROUND OF THE INVENTION

1. Field of the Invention

The present invention relates, in general, to delegated computing system, and more particularly to management of persistent delegated environments.

2. Relevant Background

Increasingly, business data processing systems, entertainment systems, and personal communications systems are implemented by computers interconnected by networks (e.g., the Internet). The Internet and other forms of network computing are rapidly emerging as the preferred system for distributing and exchanging data. Another rising use of network resources is the concept of offering services via a network.

The Internet, or any computing network, is a collection of heterogeneous computers and networks coupled together by a web of interconnections using standardized communications protocols. The Internet is characterized by its vast reach as a result of its wide and increasing availability and easy access protocols.

Service based network computing is a broad characterization of software applications and other services maintained on a network that can be utilized by one or more local users without requiring each user to possess the resources (i.e., software) typically associated with each such service. Traditionally, a user working in a computing environment possesses a processor and some form of data storage means that permits the user to maintain various software applications on his or her personal computer. For example, a user working on a personal computer may possess a word processing application, a spreadsheet application, and a graphics application. The operating system of the user's computer manages the environment of the operation of the various software applications stored locally on the user's machine as well as the data that can be accessed by each application. In a simplified example, imagine a user accessing a text document file, stored on the user's computer, by the word processing program that is also stored and executed on the user's computer. When the user wishes to use such an application, the operating system, under the direction of the user, accesses the application software and necessary data files to create a unique computing environment for that user. Through the application software that is being run on the user's computer, various input files, also normally housed on the user's computer, can be accessed, modified, and/or created.

The introduction of network computing has dramatically altered this simple model. As indicated above, network computing in the form of business data processing systems, entertainment systems, and personal communications systems has rapidly evolved. Many large business enterprises utilize local area networks that link computers together. These networks provide both a means to distribute the storage of data and to centrally standardize applications available to users coupled to the network. Continuing with our previous example, a user of a local area network may access a word processing application residing on a server and gain access to data files stored elsewhere in the network. In this scenario, the user's computer acts as a portal to the network server which houses and executes the application. The actual word processing software is not stored or executed on the user's computer but rather on the server on the local area network. Similarly, the input data file may also not be stored on the user's computer but found elsewhere on the network. There are multiple scenarios, variations, and combinations of scenarios that follow this theme of operating in a network environment including grid-based computing.

Grid-based computing utilizes system software, middleware, and networking technologies to combine independent computers and subsystems into a logically unified system. Grid-based computing systems are composed of computer systems and subsystems that are interconnected by standard technology such as networking, I/O, or web interfaces. While comprised of many individual computing resources, a grid-based computing system is managed as a single computing system.

Delegated computing refers to the use and access of services supplied via a network system. A grid-based computing system or other type of network computing architecture is established to provide various services. A user accessing one or more of these services delegates control of his or her computing environment to that particular service. Thus the user seeking a word processing service delegates word processing operations to a particular service on a particular network or grid. The combination of various delegated services forms a user's delegated environment.

One aspect of network based computing that has restrained the evolution of network based services is the idea of central management. In a local network, such as described above, the delegated environment corresponding to any one service is typically standardized. The operating system of the user's computer, the network interface, the applications offered by the service network, version numbers, data structure, and so forth are centrally managed to ensure maximum compatibility within the local area network. Even the commercial software market is standardized to some degree. Currently, an operating system or software application has a limited life. Upgrades on the operating system, communication software, network protocols, data structures, hardware and other peripheral components eventually make older version software inoperable. The environment in which they were functional is lost.

Each user's computing environment is unique and correspondingly each user's delegated computing environment is unique. The expertise and familiarity that a user develops with a particular version of software or interaction with a type of data file can be considerable. The loss in productivity associated with an upgrade or version change is well known and highly scrutinized in large organizations. New versions of software may offer new and improved capabilities or correct previously identified failings, yet the decision to upgrade is not universally accepted. Some users would prefer to maintain the current familiar environment while others will jump at acquiring new capabilities. It would be desirable therefore to allow users operating in a distributed service orientated network environment to maintain different user environments.

The introduction of network based services amplifies this need. Each user accessing a network based service creates a unique environment. For example, a first user, operating on a previous version of an operating system, may access a service based word processing service and create a new data file. Based on the first user's operating system, the word processing application's capabilities may be limited so as to be compatible with the user's operating system. A second user, whose computer utilizes a newer version of the operating system, accesses the same service. Based on the newer operating system, different capabilities of the same word processing application may be available. In this example, the files created by the two users are produced under different delegated environments. If the version of the service software changes, the environment in which the two user's files were created is lost even though both users have not altered their position. While software applications strive to be backward compatible, there is no guarantee that either user will be able to recreate the environment in which the original file was created.

What is needed are computer implemented methods and systems for dynamic persistent user management in delegated environments. Users accessing services in a delegated environment need to be able to consistently and reliably recreate the environment in which they had previously operated so as to access, edit and, if necessary, recreate files in that prior environment.

SUMMARY OF THE INVENTION

Briefly stated, the present invention involves computer implemented methods, systems, and computer media for managing dynamic persistent user delegated environments. A delegated environment manager identifies and inventories characteristics associated with each user's delegated environment. The inventory of the characteristics associated with a particular delegated environment is stored for later retrieval. Upon receiving a request to recreate a previously stored delegated environment, the delegated environment manager retrieves the inventory of the characteristics associated with the requested delegated environment and compares that inventory of characteristics with an inventory of characteristics associated with a user's current delegated environment. Differences between the two inventories are identified, and the delegated environment manager alters characteristics as necessary to recreate the previously stored delegated environment.

In another aspect of the present invention, a user may store records of two or more delegated environments. Beyond the creation of an initial stored delegated environment profile that takes place when a user first accesses a services orientated computing network, the user may elect to store other, subsequently created, delegated environments. A user that is associated with multiple delegated environments may select and recreate any of these previously stored delegated environments. The delegated environment manager stores the characteristics inventory of the initial delegated environment and in one embodiment of the present invention, stores changes in the characteristic inventory based on that initial profile. In other embodiments, a new profile and complete inventory of characteristics is stored with each unique delegate environment. In either approach, the previous delegated environment can be recreated by a comparison of the characteristic inventories.

The foregoing and other features, utilities and advantages of the invention will be apparent from the following more particular description of an embodiment of the invention as illustrated in the accompanying drawings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The figures depict embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION OF THE PREFERRED EMBODIMENTS

Figure 1:
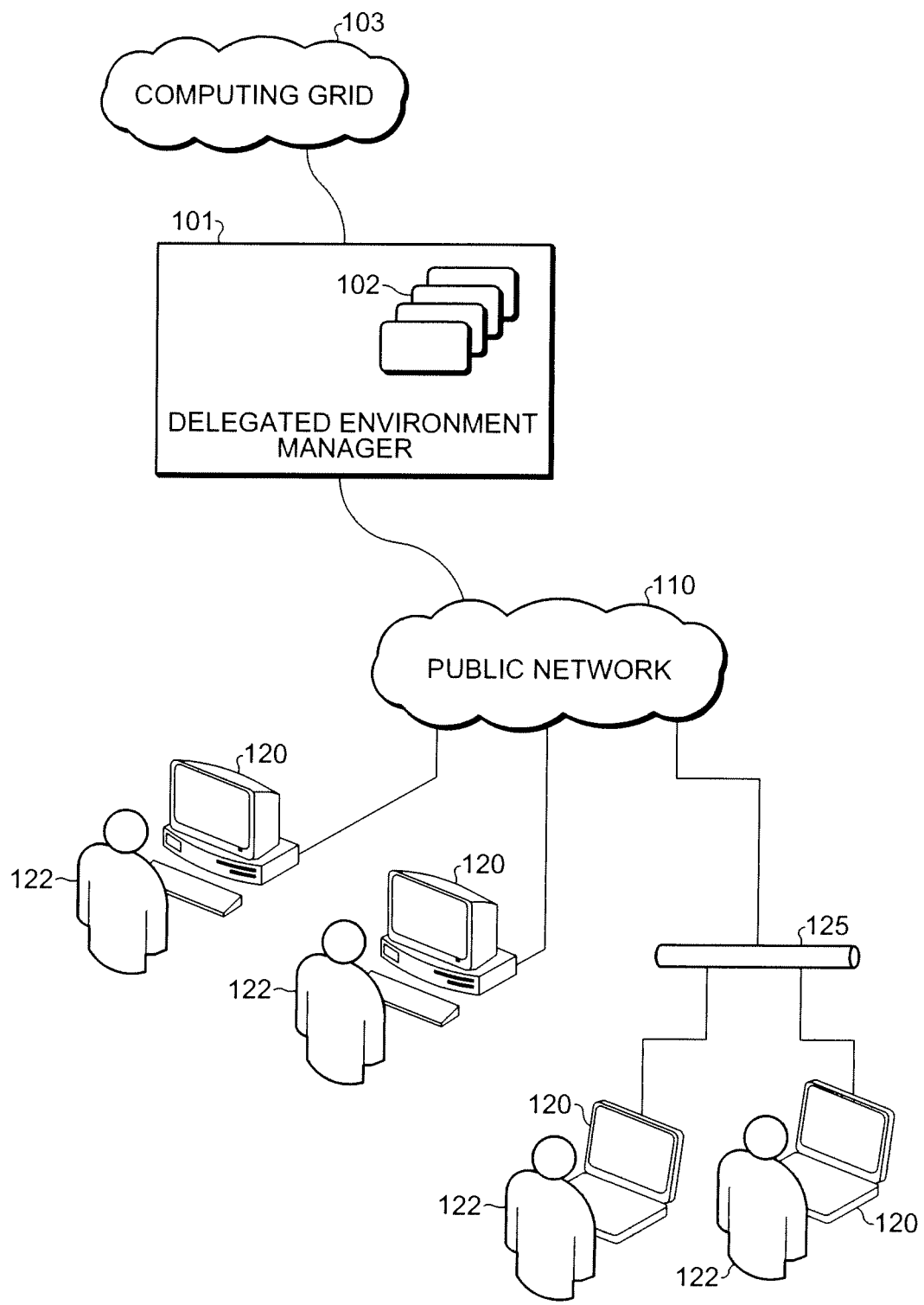
FIG. 1 shows a high level overview of a networked computer environment in which the present invention for dynamic persistent user management in a delegated environment may be implemented.

FIG. 1 illustrates a high level overview of a network environment for practicing some embodiments of the present invention. A delegated environment manager 101 determines and stores an inventory of characteristics of a user's delegated environment so that it may be recreated later. It is to be understood that although the delegated environment manager 101 is illustrated as a single entity, as the term is used herein, a delegated environment manager 101 refers to a collection of functionalities which can be implemented as software, hardware, firmware or any combination of these. Where a delegated environment manager 101 is implemented as software, it can be implemented as a standalone program, but can also be implemented in other ways, for example, as part of a larger program, as a plurality of separate programs, as one or more device drivers or as one or more statically or dynamically linked libraries.

It is to be further understood that a delegated environment manager 101 can be instantiated as part of a computing grid 103 or as a component separate from the computing grid 103 (as illustrated in FIG. 1) that works in conjunction therewith. A delegated environment manager 101 can be instantiated on and/or as part of a server, client, firewall, intrusion detection system, proxy, gateway, switch, front-end and/or any combination of these and/or other computing devices and/or platforms.

As shown in FIG. 1, the delegated environment manager 101 is, in this embodiment, interposed between a computing grid 103 and a public network 110. The computing grid 103 is representative of a distributive computing environment in which resources and tasks are distributed across numerous nodes. The computing grid 103 is capable of supporting a delegated computing environment in which one or more nodes is capable of providing one or more computing services.

The public network 110 can be any network accessed by one or more entities that allows communication between various computing resources. In the illustration shown in FIG. 1, the public network 110 can represent a Local Area Network (LAN) such as an Intranet, or a Wide Area Network (WAN) such as the Internet, or any other similarly configured means for communicating data and resources between disparate computing nodes.

With reference to FIG. 1, an exemplary system for implementing the invention includes a general purpose computing device in the form of a conventional personal computer 120 or the like, including a processing unit, a system memory, and a system bus that couples various system components including the system memory to the processing unit. The personal computer 120 also typically includes some form of memory to provide non-volatile storage of computer readable instructions, data structures, program modules and other data for the personal computer 120. Although the exemplary environment described herein employs a hard disk or other types of storage, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

The personal computer 120 may operate in a networked environment using logical connections to one or more remote computers and/or networks. The logical connections depicted in FIG. 1 include a computing grid 103, a public wide area network (WAN) 110, and a local Ethernet 125. Such networking environments are commonplace in offices, enterprise-wide computer networks, Intranets and the Internet.

The delegated environment manager 101 addresses the individual environment of users 122 accessing a computing grid 103 for the purpose of conducting delegated computing. The delegated environment manager, in one embodiment of the present invention, stores inventories 102 of each user's delegated environment. Delegated environments are computing environments in which tasks normally associated with a personal computer or a centralized server are distributed over a variety of nodes. The delegation of computing services is widely gaining popularity. Rather than maintaining application software on each personal computer 120, a delegated environment operates under the assumption that a user 122 can access any service or application needed to carry out a particular function via a network connection. Services such as data management, word processing, graphics and so forth can be rented from a service provider much like television service is rented from a cable television provider. Just as a user can subscribe to unlimited use of particular types of television services, a user in a computing environment can subscribe to unlimited access to various computing services. Also a pay per use, similar in concept to the pay per view counterpart in television, is fully supported by the present invention.

As each individual user's 122 needs are different, the services demanded and selected by the users will vary. The delegated environment under which the delegated services operate will also vary. Based on the user's 122 connections with both the public network 110 and computing grid 103 as well as the capability of the user's 122 personal computer 120 or computing device, the environment in which the delegated services will function is unique.

The delegated environment manager 101 of the present invention identifies and stores user 122 specific delegated environments in inventories 102 and provides a way by which the delegated environment of any user 122 can be recreated. One skilled in the art will appreciate the versatility and usefulness of the present invention's ability to identify characteristics of each delegated environment so as to quickly and efficiently restore the environment upon request.

Figure 2:
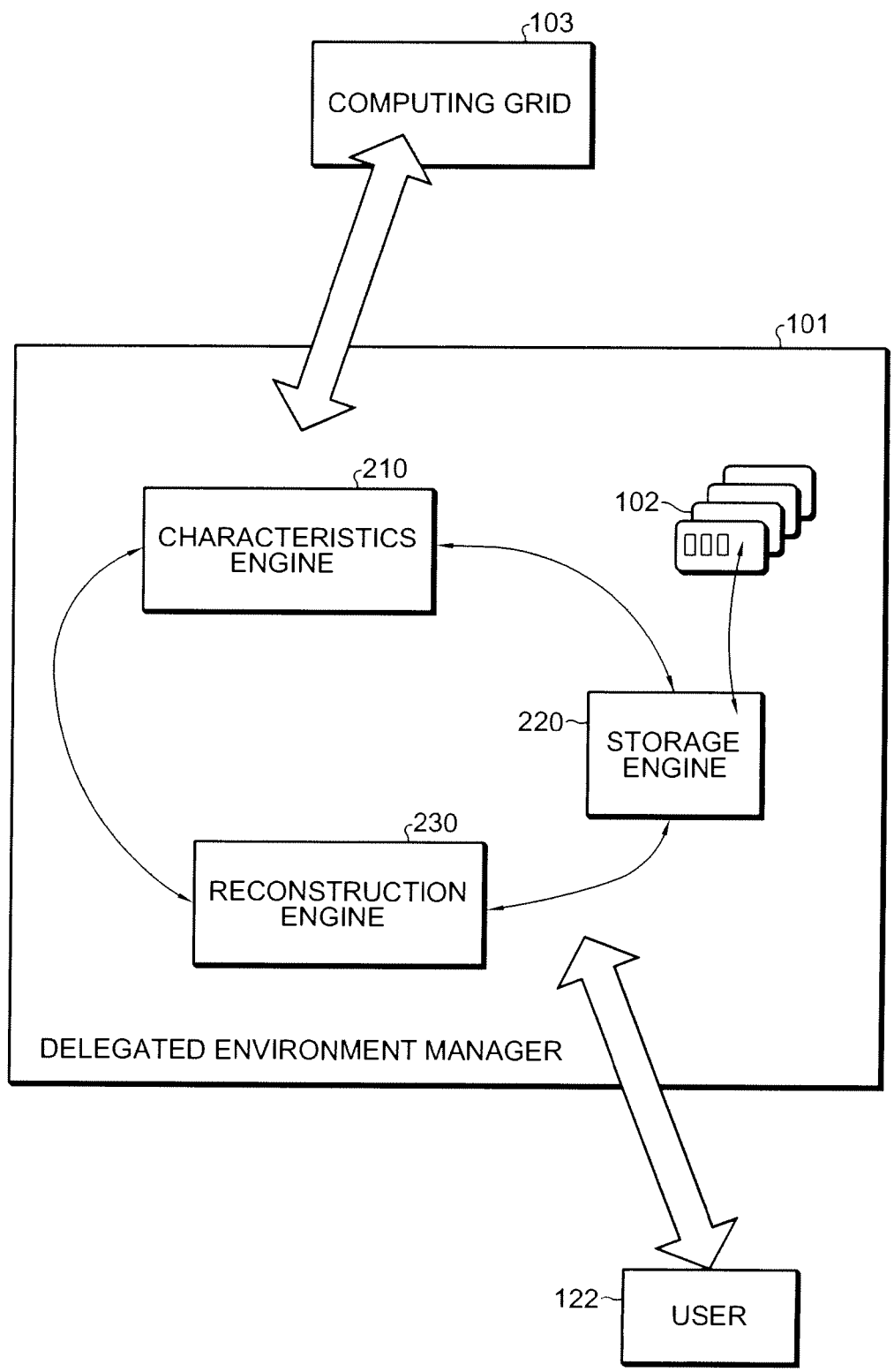
FIG. 2 shows a high level block view of a system for dynamic persistent user management in a delegated environment according to one embodiment of the present invention.

FIG. 2 shows one embodiment of a delegated environment manager 101 according to the present invention. The delegated environment manager 101 comprises a characteristic engine 210, a storage engine 220, and a reconstruction engine 230. As shown in FIG. 2, each of the engines interact with each other to perform the functionality of the delegated environment manager 101. While the functionalities of the various engines are shown to reside within the conceptual boundaries of the delegated environment engine, one skilled in the relevant art will appreciate that the functionalities of the various engines may be implemented by code, modules, subroutines, and so forth whose physical location is distributed across various resources without detrimentally impacting the usefulness of the present invention.

As shown in FIG. 2, a user 122 seeking delegated services via a network is directed to the delegated environment manager 101. In this embodiment of the present invention, the delegated environment manager 101 is a front-end for a computing grid 103 which houses resources capable of providing services to the user 122. The environment demanded and developed by each user 122 and his or her personal computer 120 is unique. Similarly, the service that each user 122 requests and accesses from the computing grid 103 is unique to that user. Accordingly, each user creates a unique delegated environment.

To provide comprehensive and useful services to users possessing a variety of computing recourses, the computing grid must be able to adapt to each user's delegated environment. For example, the delegated environment for a personal computer operating under Microsoft Windows XP® will be significantly different than one operating under Sun Solaris®. Furthermore, the types of services selected by the user 122 will also determine the delegated environment for that particular user 122.

According to one embodiment of the present invention, each user's delegated environment possesses identifiable characteristics. These characteristics represent a footprint of the user's delegated environment that can be captured and stored and managed. The delegated environment manager 101 performs these and other functionalities. Recall that a user's delegated environment encompasses a combination of characteristics. Some of these characteristics, or attributes, or parameters as they may also be referred, are based on the user's local computing environment. The operating system functioning on the user's machine is one example of one characteristic of the delegated environment that is based on the user's local environment. The network connections, the type of network, and certainly the type of service(s) that the user is seeking to access also possesses identifiable characteristics that form a user's delegated environment.

In one embodiment of the present invention, the delegated environment manager 101 identifies and captures these characteristics. Upon a user's initial access to a service from a service network or grid, the delegated environment manager 101 creates a user profile, captures a representation of the user's delegated environment 102, and stores the representation of the environment so that the environment can be recreated at a later time. The characteristics engine 210 identifies and enumerates each characteristic associated with each user's delegated environment. Delegated environment characteristics represent those attributes or parameters of the operating system, application software, libraries, directories, and so forth that make the user's environment unique. Once identified and enumerated, the characteristics are inventoried and categorized. In another embodiment of the present invention, each characteristic of the user's delegated environment, or selected characteristics of the user's delegated environment, are validated. To validate a particular characteristic, the user's characteristic is compared to a corresponding characteristic from a vendor that is known to be authentic.

Once the characteristics engine 210 has inventoried the characteristics associated with a particular user's delegated environment, the storage engine 220 stores the inventory 102 in a persistent data base. As will be appreciated by one skilled in the art, the actual storage of these characteristics and the type of database may vary widely without diminishing the usefulness or functionality of the present invention. Indeed, it is likely and contemplated that the storage of characteristics representing a user's delegated environment may be stored over several machines, hard drives, networks or other storage devices as is known in the art. The storage engine 220 does not store the actual characteristic data (files) but rather stores the inventory of the characteristics associated with a partial delegated environment. The inventory provides the delegated user manager 101 the information needed to recreate the user's specific delegated environment.

The reconstruction engine 230 recreates a user's delegated environment. A user may, upon request, seek to recreate a specific delegated environment. In one embodiment of the present invention, a user may desire to recreate a specific environment associated with a particular software application or data file. For example, a reanalysis of a particular data file by a particular software application may be necessary to make qualified engineering, legal, or business decisions. Altering any aspect of the environment may invalidate the original analysis. To recreate such an ideal environment, the reconstruction engine 230 compares a characteristic inventory of the user's current delegated environment to the inventory of characteristics associated with the requested delegated environment.

The reconstruction engine 230 communicates with both the storage engine 220 and the characteristics engine 210 to accomplish a reconstruction of a desired environment. The storage engine 220 provides an inventory of characteristics associated with the delegated environment that the user wishes to recreate. The characteristic engine 210 identifies, enumerates, and finally inventories the characteristics associated with the user's current delegated environment. The reconstruction engine 230 compares the inventory of characteristics of the requested environment to those characteristics associated with the current environment and determines what characteristics should be altered, added, or deleted to recreate the requested delegated environment.

Once the reconstruction engine 230 identifies which characteristics of the current delegated environment should be altered, deleted, or supplemented to recreate a previously stored delegated environment, the reconstruction engine 230 communicates with both the computing grid and the user's local environment to ensure those changes take place.

In one embodiment of the present invention, the delegated environment manager 101 maintains and manages multiple delegated environments 104 for each user profile 102. In one embodiment, the storage engine 220 maintains an initial delegated environment characteristic profile and then keeps track of changes or deltas from that environment. In another embodiment of the present invention, an inventory of characteristics associated with each stored delegated environment is maintained.

Figure 3:
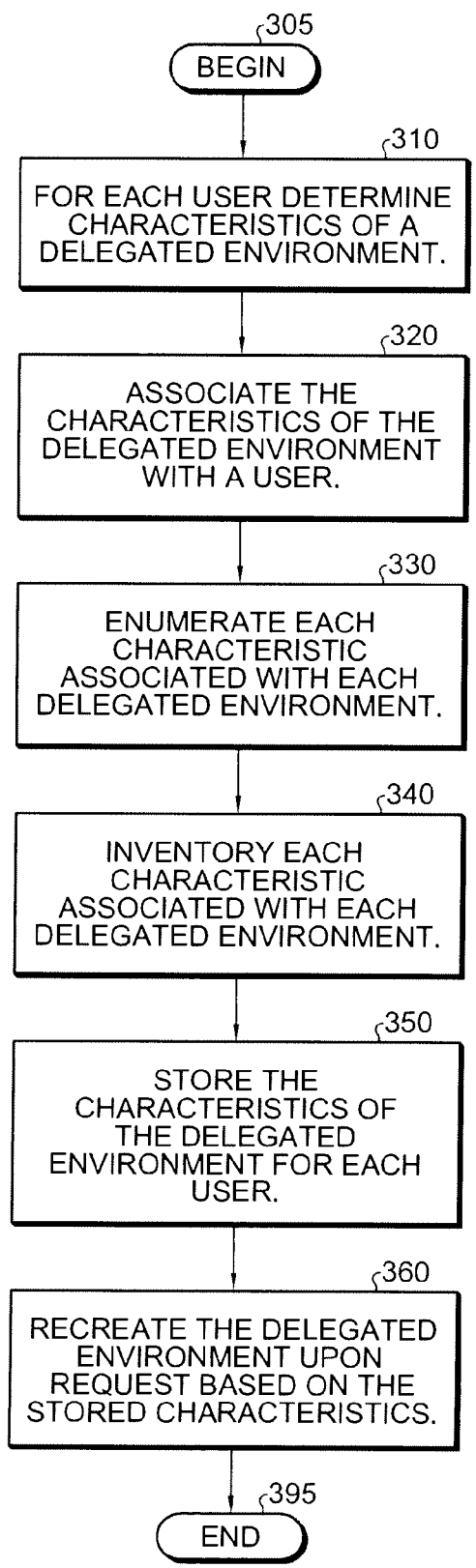
FIG. 3 shows a flowchart for the steps of dynamic persistent user management in a delegated environment according to one embodiment of the present invention.

FIG. 3 is a high level flow chart for a method for dynamic persistent management of delegated environments according to one embodiment of the present invention. As previously discussed, the delegated environment manager 101, through the operations of the characteristics engine 210, the storage engine 220, and the reconstruction engine 230, determines 310 the characteristics associated 320 with a user's delegated environment. The characteristics engine 210, in alternative embodiments, enumerates 330 and inventories 340 each characteristic associated with each delegated environment of the user. This information is stored 350 by the storage engine 220 for later retrieval.

Upon receiving a request to recreate a particular delegated environment, the reconstruction engine 230 recreates 360 the delegated environment by accessing the characteristics associated with the identified delegated environment and compares it to the characteristic inventory associated with the user's current delegated environment. The request to recreate a particular delegated environment contains information identifying the user, the date and time associated with the environment, specific files that may be associated with the environment, and other information that can identify which of the stored delegated environments must retrieved and restored. In one embodiment, the delegated environment manager 101 provides the requesting user a list of stored environments to choose from when a specific environment cannot be identified. Once a delegated environment to be restored has been identified, its characteristics are retrieved. The disparities in the characteristics are noted by the reconstruction engine 230 and the delegated environment manager 101 accesses various resources to recreate the specified delegated environment.

As an illustration of the present invention, consider the following simplified example. Assume that a user establishes an account with a computing grid to provide a word processing service. The user's local system has a specific operating system and other various aspects that creates the user's local environment. Correspondingly, the computing grid possesses a word processing service that interacts with the user's local environment to provide the user with a word processing application, i.e., service. The combination of the characteristics associated with the computing grid's word processing service and the user's local environment creates a unique delegated environment.

A delegated environment manager 101 consistent with the present invention is interposed between the user's local environment and the computing grid. Upon the user seeking a service from the computing grid, the delegated environment manager 101 creates a delegated user profile associated with that user. The delegated environment manager 101 identifies the characteristics associated with that user's delegated environment and stores an inventory of those characteristics for later use.

Assume for the purpose of this example that two years have passed and the user wishes to once again access and modify the document originally created using the word processor service referenced above. Over this time the computing grid has updated the word processing service software to remain competitive and to provide customers with new and useful capabilities. The user in this example desires, however, to use the old word processing application with which he or she is familiar. Additionally, while it is likely that upgrades to the word processing application would be backward compatible, there is normally no guarantee of such compatibility. Furthermore, it is likely that as the period of obsolescence increases, the likelihood of compatibly will decrease, potentially leaving the user with the inability to access or modify previously created documents.

In this example, the delegated environment manager 101 intercedes to recreate the environment under which the user originally created the document. The reconstruction engine 230 through communication with the characteristic engine 210 identifies the characteristics associated with the user's current delegated environment and creates an inventory of those characteristics. The reconstruction engine 230 accesses, via the storage engine 220, the characteristic inventory associated with the requested delegated environment. The two lists of characteristics are compared with differences being noted. The differences in the list may be additional characteristics, missing characteristics, or characteristics that have been altered. In one embodiment of the present invention, each characteristic listed in one list is compared to a corresponding characteristic of the second list to see whether the characteristic has been changed. The delegated environment manager 101 takes the steps necessary to alter the necessary characteristics to recreate the desired delegated environment. In one embodiment of the present invention, the operating system associated with the current delegated environment interacts with the characteristics of the stored delegated environment to ascertain changes necessary to characteristics of the current delegated environment to recreate the previously stored delegated environment. From the user's perspective, the user sees the same word processing application and service that he or she used to create the original document. While other users of the same service may be accessing and using a different version of the word processing application from the same service provider, the current user is able to recreate a previously stored delegated environment altering only those characteristics that have changed since the file was originally created.

A presently preferred embodiment of the present invention and many of its improvements have been described with a degree of particularity. As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer implemented method for dynamic persistent user management in delegated environments, the method comprising:
   generating a first delegated environment for a user operating a first computing device, the first delegated environment including the delegation of the use or access of at least one service from the first computing device to a second computing device that is logically connected to the first computing device by at least one network or grid;
   determining characteristics associated with the first delegated environment for a user, wherein at least one of the characteristics includes the type of the at least one service;
   storing an inventory of the characteristics associated with the first delegated environment;
   associating the inventory of characteristics associated with the first delegated environment with the user; and
   recreating, by an operating system associated with a current delegated environment, the first delegated environment from the inventory based on a request identifying the user; wherein the recreating comprises:
   retrieving the stored inventory of characteristics,
   comparing the stored inventory of characteristics to a current inventory of characteristics associated with the current delegated environment, the current delegated environment being created after the first delegated environment,
   determining differences between the stored inventory of characteristics and the current inventory of characteristics by interacting with the stored inventory of characteristics to ascertain changes necessary to characteristics of the current delegated environment to recreate the first delegated environment, and
   altering the current inventory of characteristics to match the stored inventory of characteristics by using the differences to add or delete at least one characteristic to or from the current inventory.

2. The computer implemented method of claim 1, wherein the first delegated environment varies from another delegated environment associated with another user.

3. The computer implemented method of claim 1, wherein the determining comprises categorizing each of the characteristics of the first delegated environment.

4. The computer implemented method of claim 3, wherein the determining further comprises enumerating each of the characteristics of the first delegated environment.

5. The computer implemented method of claim 3, wherein the determining further comprises validating each characteristic of the first delegated environment for each user.

6. The computer implemented method of claim 3, wherein the determining further comprises ascertaining a particular version of service to be associated with each of the characteristics of the first delegated environment.

7. The computer implemented method of claim 1, wherein the storing comprises capturing a listing of each of the characteristics of the first delegated environment.

8. The computer implemented method of claim 1, wherein determining differences between the stored inventory of characteristics and the current inventory of characteristics comprises determining whether each characteristic has changed.

9. The computer implemented method of claim 1, wherein determining differences between the stored inventory of characteristics and the current inventory of characteristics comprises determining whether there are additional characteristics or missing characteristics.

10. A computer implemented method for recreating a user's delegated environment, comprising:
   generating a first delegated environment for a user that includes delegation of use or access of at least one service between first and second computing devices that are logically connected by at least one network or grid;
   determining characteristics associated with the first delegated environment for a user, wherein at least one of the characteristics comprises a first version of the at least one service;
   storing an inventory of the characteristics associated with the first delegated environment;
   sending a request to recreate the first delegated environment; and
   recreating, by an operating system associated with a current delegated environment, the first delegated environment from the inventory, the recreating comprising:
   accessing the inventory of characteristics associated with the first delegated environment;
   determining differences between an inventory of characteristics of the current delegated environment and the inventory of characteristics of the first delegated environment by interacting with the inventory of characteristics of the first delegated environment to ascertain changes necessary to characteristics of the current delegated environment to recreate the first delegated environment, the inventory of characteristics associated with the current delegated environment including a second version of the at least one service that was created after the first version of the at least one service; and altering the current delegated environment to match the first delegated environment by altering the inventory of characteristics associated with the current delegated environment, wherein after the altering, the user has access to the first version of the at least one service.

11. The computer implemented method of claim 10, wherein characteristics of the first delegated environment are unique relative to the current delegated environment.

12. The computer implemented method of claim 10, wherein the inventory of characteristics of the first delegated environment are categorized prior to being stored.

13. The computer implemented method of claim 10, wherein the inventory of characteristics of the first delegated environment are enumerated prior to being stored.

14. The computer implemented method of claim 10, wherein each characteristic of the first delegated environment is validated.

15. A computer implemented method, comprising:

accessing, by a first computing device, a first version of at least one delegated service from a second computing device that is connected to the first computing device by at least one computing grid;

determining characteristics associated with the accessing of the first version of the at least one delegated service;

storing an inventory of the characteristics associated with the accessing of the first version of the at least one delegated service in a storage engine;

accessing, by the first computing device or another computing device, a second version of the at least one delegated service; and accessing, by the first computing device or another computing device after the accessing of the second version of the least one delegated service, the first version of the at least one delegated service using the stored inventory of characteristics associated with the first accessing of the first version of the at least one delegated service, the accessing of the first version after the accessing of the second version comprising, by an operating system associated with a current delegated environment:

accessing the stored inventory of characteristics associated with the accessing of the first version, comparing the stored inventory of characteristics to a current inventory of characteristics associated with the current delegated environment, determining differences between the stored inventory of characteristics and the current inventory of characteristics by interacting with the stored inventory of characteristics to ascertain changes necessary to characteristics of the current delegated environment to match the stored inventory of characteristics, and altering the current inventory of characteristics to match the stored inventory of characteristics using the changes.

16. The computer implemented method of claim 15, wherein the current inventory of characteristics comprises an inventory of characteristics associated with the accessing of the second version of the at least one delegated service.

17. The computer implemented method of claim 16, further comprising:

accessing, by the first computing device or another computing device after the accessing of the first version of the least one delegated service which was after the accessing of the second version of the at least one delegated service, the second version of the at least one delegated service by accessing the inventory of characteristics associated with the accessing of the second version of the at least one delegated service, and altering the inventory of characteristics associated with the first version of the at least one delegated service to match the inventory of characteristics associated with the second version of the at least one delegated service.

18. The computer implemented method of claim 15, further comprising:

accessing, by the first computing device or another computing device after the accessing of the first and second versions of the at least one delegated service, a third version of the at least one delegated service; and altering an inventory of characteristics associated with the third version of the at least one delegated service to match the inventory of characteristics associated with the first version or an inventory of characteristics associated with the second version of the at least one delegated service.

\* \* \* \* \*